US008768868B1

(12) United States Patent
Cheng et al.

(10) Patent No.: US 8,768,868 B1
(45) Date of Patent: Jul. 1, 2014

(54) OPTIMAL MULTI-CLASS CLASSIFIER THRESHOLD-OFFSET ESTIMATION WITH PARTICLE SWARM OPTIMIZATION FOR VISUAL OBJECT RECOGNITION

(75) Inventors: Shinko Y. Cheng, Campbell, CA (US); Yang Chen, Westlake Village, CA (US); Deepak Khosla, Camarillo, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 259 days.

(21) Appl. No.: 13/440,881

(22) Filed: Apr. 5, 2012

(51) Int. Cl.
  *G06N 5/00* (2006.01)
(52) U.S. Cl.
  USPC ............................ 706/12; 382/224; 705/35
(58) Field of Classification Search
  USPC .......................................................... 706/12
  See application file for complete search history.

(56) References Cited

U.S. PATENT DOCUMENTS

| 7,912,246 B1 * | 3/2011 | Moon et al. .................... 382/103 |
| 2010/0141787 A1 * | 6/2010 | Bigioi et al. ............... 348/222.1 |

OTHER PUBLICATIONS

Kennedy, J.; Eberhart, R.; Neural Networks, 1995, "Particle Swarm Optimization," Proceedings., IEEE International Conference, Nov./Dec. 1995, 1942-1948 vol. 4.

Duda, R.O., Hart, P.E., Stork, D.E., Pattern Classification, John Wiley & Sons, Chichester, 2001, Chapter 5.2.2.

Hastie, T., Tibshirani, R., Friedman, J., The Elements of statistical Learning. Data Mining, Inference, and Predition, 2nd edn., Springer Series in Statistics, 2009, p. 658.

Everingham, M., Good, L.V., Williams, C.K.I., Winn, J., Zisserman, A., The pascal visual object classes (voc) challenge, International Journal of Computer Vision, 88, 303-336, 2010.

Kasturi, R., Goldof, D., Soundararajan, P., Manohar, V., Garofolo, J., Bowers, R., Boonstra, M., Korzhova, V., Zhang, J., Framework for performance evaluation of face, text, and vehicle tetction and tracking in video: Data, metrics and protocol, IEEE Transactions on Pattern Analysis and Machine Intelligence, 31, 319-336, 2009.

Ellis, A., Ferryman, J.M., PET 2010 and PETS2009 evaluation of results using individual ground truthed single views, In IEEE International Conference on Advanced Video and Signal Based Surveillace (AVSS), pp. 135-142, 2010.

Dollar, P., Wojek, C., Schiele, B., Perona, P., Pedestrian detection: A benchmark, In Computer Vision and Pattern Recognition, 2009, all pages.

(Continued)

*Primary Examiner* — Jeffrey A Gaffin
*Assistant Examiner* — Kalpana Bharadwaj
(74) *Attorney, Agent, or Firm* — Tope-McKay & Associates (57) ABSTRACT

Described is a system for multi-class classifier threshold-offset estimation for visual object recognition. The system receives an input image with input features for classifying. A pair-wise classifier is trained for each pair of a plurality of object classes. A set of classification responses is generated, and a multi-class receiver-operating-characteristics (ROC) curve is computed for a set of threshold-offsets. An objective function of classification performance is computed from the ROC curve and optimized using particle swarm optimization (PSO) to generate a set of optimized threshold-offsets. The optimized threshold-offsets are then applied to the classification responses. The resulting classification responses are compared to a predetermined value to classify each input feature as belonging to one object class or another. The tuning of the threshold-offsets with (PSO) improves classification performance in a visual object recognition system.

24 Claims, 12 Drawing Sheets

(56) References Cited

OTHER PUBLICATIONS

Oh, S., Perera, A., Cuntoor, N., Chen, C.C., Lee, J.T., Mukherjee, S., Aggarwal, J., Lee, H., Davis, L., Swears, E., Wang, X., Ji, Q., Reddy, K., Shah, M., Vodrick, C., Pirsiavash, H., Ramanan, D., Yuen, J., Torralba, A., Song, B., Fong, A., Roy-Chowdhury, A., Desai, M., A large-scale benchmark dataset for event recognition in surveillance video, In IEEE Computer Vision and Pattern Recognition, 2011, all pages.

Wu, T.F., Lin, C.J., Weng, R.C., Pobability estimates for multi-class classification by pairwise coupling, Journal of Machine Learning Research 5, 975-1005, 2004.

* cited by examiner

AUC Change from Threshold-Offset Tuning

|  | Baseline AUC | PSO Tuned AUC | delta |
|---|---|---|---|
| Vehicle | 0.8924 | 0.5904 | (0.3020) |
| Pedestrian | 0.5257 | 0.8635 | 0.3378 |
| Bike | 0.5313 | 0.7350 | 0.2037 |

True-Positive Rate Change from Threshold-Offset Tuning

|  | Baseline TPR | PSO Tuned TPR | delta |
|---|---|---|---|
| Vehicle | 0.8806 | 0.6439 | (0.2367) |
| Pedestrian | 0.5455 | 0.7273 | 0.1818 |
| Bike | 0.5094 | 0.7170 | 0.2076 |

OPTIMAL MULTI-CLASS CLASSIFIER THRESHOLD-OFFSET ESTIMATION WITH PARTICLE SWARM OPTIMIZATION FOR VISUAL OBJECT RECOGNITION

GOVERNMENT LICENSE RIGHTS

This invention was made with government support under U.S. Government Contract Number HR0011-10-C-0033 DARPA Neovision2. The government has certain rights in the invention.

BACKGROUND OF THE INVENTION (1) Field of Invention

The present invention relates to a system for improving the performance of a multi-class classifier in a visual object detection system and, more particularly, to a system for improving the performance of a multi-class classifier in a visual object detection system using particle swarm optimization to estimate threshold-offset.

(2) Description of Related Art

Multi-class classification involves assigning one of several class labels to an input object. Typical approaches to multi-class visual object recognition utilize the precision-recall curve to depict recognition performance. The Precision-Recall curve is a widely used tool to evaluate the performance of scoring functions in discriminating between two populations. The use of the Precision-Recall curve stems from focusing on the problem of image retrieval as opposed to surveillance. The separate domains of image retrieval and surveillance consider different types of errors as more or less tolerable. For instance, the number of images of the same target that appears before a surveillance object recognition system is more numerous and, as a partial result, false-positive rates of whole percentage points are not as tolerable as they are in image retrieval.

Multi-class visual object recognition for surveillance has been an active research problem, but much of the progress has been made on tracking and the 2-class problem, as opposed to the multi-class problem. For the multi-class problem, the community appears waiting for the results to emerge from the image retrieval research. Because of this and because multi-class visual object recognition has defined different types of errors as tolerable, the issue of tuning the multi-class classification to suit the surveillance problem has not been investigated in depth. Thus, a continuing need exists for a solution to the problem of multi-class visual object recognition for surveillance.

SUMMARY OF THE INVENTION

The present invention relates to a system for multi-class classifier threshold-offset estimation. The system comprises one or more processors and a memory having instructions such that when the instructions are executed, the one or more processors perform operations of first receiving an input image comprising a set of input features. A classifier is then trained for each pair of a plurality of object classes M. A set of classification responses r is generated based on the set of input features. A multi-class receiver-operating-characteristics (ROC) curve is computed for a set of threshold-offsets x. Next an objective function of classification performance f(x) is computed from the ROC curve. The objective function of classification performance f(x) is then optimized through particle swarm optimization to generate a set of optimized threshold-offsets x. The set of optimized threshold-offsets x is applied to the set of classification responses r to generate a set of classification responses r'. Each classification response in the set of classification responses r' is compared to a predetermined value to classify the set of input features as belonging to an object class.

In another aspect, the set of classification responses r is a set of M(M−1)/2 classification responses, where $r = [r_{12}\ r_{13}\ r_{14} \ldots r_{1m}\ r_{23}\ r_{24} \ldots r_{2m}, r_{34} \ldots r_{(m-1)m}]$, and each subscript denotes an object class.

In another aspect, $r' = r + x$, where $x = (t_{12}, t_{13}, t_{14}, \ldots, t_{1M}, \ldots)$, and where t denotes a threshold-offset.

In another aspect, a vote designating the set of input features as belonging to one object class of each pair of the plurality of object classes M or the other is generated to generate a set of votes. The set of votes is collected to determine which object class of the plurality of object classes M received a majority of the set of votes. The set of input features is classified as belonging to the object class receiving the majority of the set of votes.

In another aspect, an area under the ROC curve (AUC) is extracted to determine a true-positive (TP) rate for a given false-positive rate; and the objective function is defined as:

$$f_1(x) = AUC_1(r'(x)) + AUC_2(r'(x)) + AUC_3(r'(x)) + \ldots,$$

wherein each subscript denotes an object class.

In another aspect, an area under the ROC curve (AUC) is extracted to determine a true-positive (TP) rate for a given false-positive rate; and the objective function is defined as:

$$f_2(x) = AUC_1(r'(x)) * AUC_2(r'(x)) * AUC_3(r'(x)) * \ldots,$$

wherein each subscript denotes an object class and * denotes multiplication.

In another aspect, an area under the ROC curve (AUC) is extracted to determine a true-positive (TP) rate for a given false-positive rate; and the objective function is defined as:

$$f_3(x) = TP_1(r'(x)) + TP_2(r'(x)) + TP_3(r'(x)) + \ldots,$$

wherein each subscript denotes an object class.

In another aspect, an area under the ROC curve (AUC) is extracted to determine a true-positive (TP) rate for a given false-positive rate; and the objective function is defined as:

$$f_4(x) = TP_1(r'(x)) * TP_2(r'(x)) * TP_3(r'(x)) * \ldots,$$

wherein each subscript denotes an object class and * denotes multiplication.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for improving the performance of a multi-class classifier in a visual object detection system and, more particularly, to a system for improving the performance of a multi-class classifier in a visual object detection system using particle swarm optimization (PSO) to estimate threshold-offset. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for multi-class classifier threshold-offset estimation. The system is typically in the form of a computer system, computer component, or computer network operating software or in the form of a "hard-coded" instruction set. This system may take a variety of forms with a variety of hardware devices and may include computer networks, hand-held computing devices, cellular networks, satellite networks, and other communication devices. As can be appreciated by one skilled in the art, this system may be incorporated into a wide variety of devices that provide different functionalities. The second principal aspect is a method for multi-class classifier threshold-offset estimation, typically in the form of software, operated using a data processing system (computer or computer network). The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details

The present invention describes a method to tune the threshold-offsets of pair-wise multi-class classifiers to maximize classification performance using Particle Swarm Optimization (PSO). The method consists of a post-processing step used to improve the performance of a multi-class classifier in a visual object detection system which locates real objects in images. The present invention improves performance on transforming images of objects-of-interest to images with marked locations of objectives-of-interest.

A well-established method of constructing a multi-class classifier, which is also utilized in the present invention, is from training a classifier for each pair of classes among M object classes (e.g., vehicle, pedestrian). With this method, a total of $M(M-1)/2$ classifiers are trained and applied to a test sample. Then, each pair-wise classifier generates a vote for a class, and a classification is determined by collecting all the votes and selecting the class with the majority vote. The immediate output from constructing a multi-class classifier from pair-wise classifiers is an optimal division only between two classes for each pair-wise classifier with a threshold of zero, disregarding the presence of any other classes.

The challenge lies in optimally selecting the threshold for each of the pair-wise classifiers to achieve the best possible classification performance. Such a situation may occur if one does not wish to operate at equal false-alarm and miss rates. In visual object detection, a false alarm, or false-positive, is an indication that an object is present in an image when it is not. A miss, or false-negative, is the absence of an indication of an object in an image when it is, in fact, present in the image. In some cases, it is more desirable to tune the classifier such that the classifier performs at a minimally tolerable false-positive (i.e., object absent, signal present) rate. For instance, it may be desirable to bias the threshold towards some classes that have a more balanced (i.e., equal in value) true-positive (i.e., object present, signal present) rate for all non-background-classes.

A receiver-operating-characteristic (ROC) curve is a graphical plot of the sensitivity for a binary (2-class) classifier system as its discrimination threshold is varied. Sensitivity refers to the true-positive rate versus false-positive rate. In order to traverse the multi-class ROC surface, multiple thresholds need to be tuned in order to obtain the thresholds that achieve the desired operating points. The invention described herein solves this problem by tuning the threshold-offsets with PSO.

PSO is a relatively simple optimization method that has its roots in artificial life in general, and to bird flocking and swarming theory in particular. Conceptually, it includes aspects of genetic algorithms and evolutionary programming. A population of potential solutions is maintained as the positions of a set of particles in a solution space, where each dimension represents one solution component. Each particle is assigned a velocity vector and the particles then cooperatively explore the solution space in search of an objective function optima. Each particle keeps track of its coordinates in a multi-dimensional space, keeping track of the current position $x_i$, and the best solution ($p_i$) it has observed so far. A global best position variable ($p_g$) stores the best location among all particles. The velocity of each particle is then changed towards $p_i$ and $p_g$ in a dynamical way according to:

$$v_i(t+1) = wv_i(t) + c_1\phi_1[p_i(t)-x_i(t)] + c_2\phi_2[p_g(t)-x_i(t)]x_i$$
$$(t+1) = x_i(t) + \chi v_i(t+1)$$

where $x_i(t)$ and $v_i(t)$ are the position and velocity vectors at time t of the i-th particle, and $c_1$ and $c_2$ are parameters that weight the influence of their respective terms in the velocity update equation, w is a decay constant which allows the swarm to converge to a solution more quickly, $\phi_1$ and $\phi_2$ are random numbers between 0 and 1 that introduce a degree of random exploration, and $\chi$ is a parameter that controls the convergence properties of the swarm.

An advantage of utilizing PSO is the ability to avoid computing complex derivatives in order to optimize the objective function. PSO allows a larger space of possible objective functions to choose from. As described in further detail below, the present invention is used to optimize objective functions that utilize the geometric or arithmetic mean of the areas under the ROC (AUC) of each class or that of the true-positive (TP) rate given a particular false-positive rate.

Figure 1:
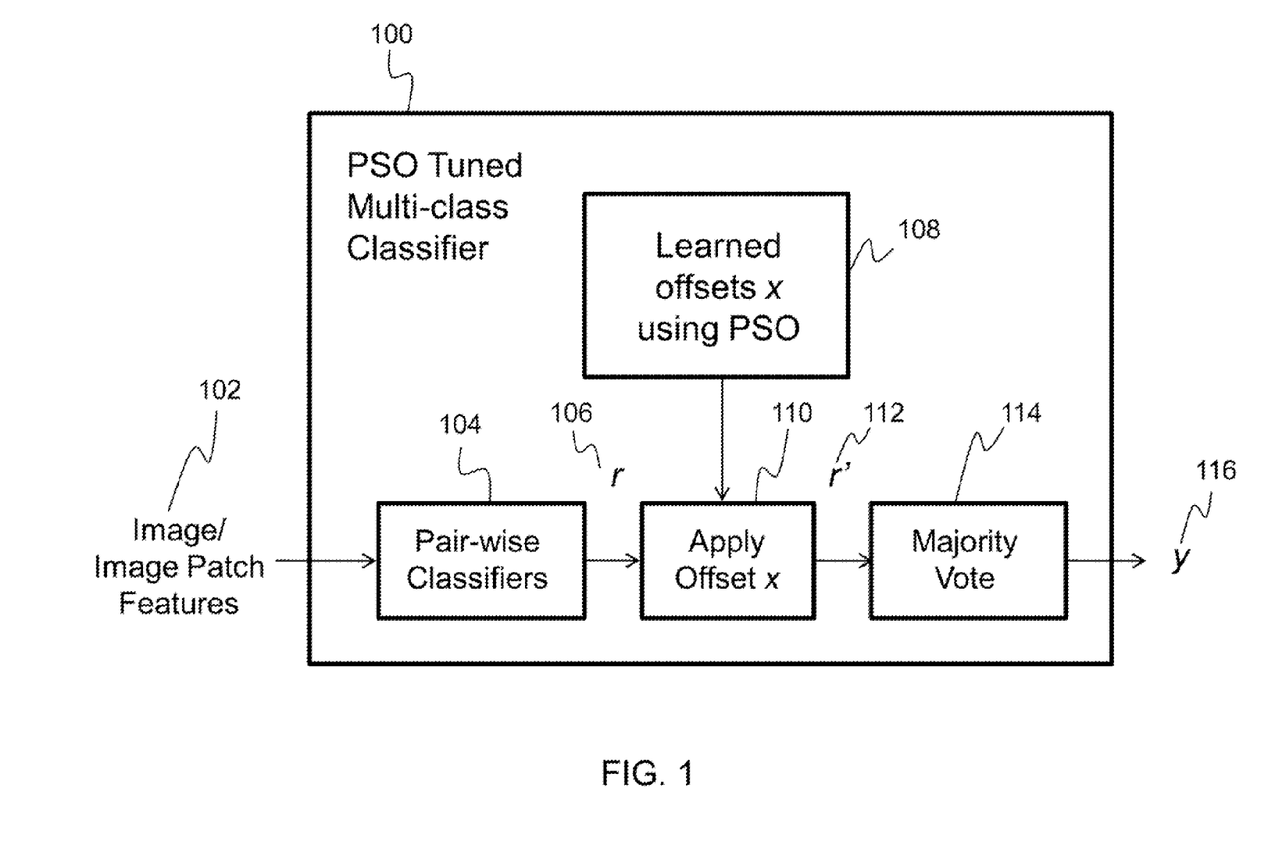
FIG. 1 is a block diagram depicting the application of learned threshold-offset using particle swarm optimization (PSO) in multi-class feature classification according to the present invention.

As described above, a well-established method of constructing a multi-class classifier is by training a classifier for each pair of classes among M classes. With this method, a total of M(M−1)/2 classifiers are trained and applied to a test sample. Each pair-wise classifier then generates a vote for a class, and a classification is determined by collecting all the votes and selecting the class with the majority vote. FIG. 1 depicts the relative location of where the learned threshold-offset of the present invention is applied in a multi-class visual object recognition system 100. In the present invention, an input image (or image patch) 102 is received. A pair-wise multi-class classifier 104 first generates M(M−1)/2 responses r 106, where $r=[r_{12}\ r_{13}\ r_{14}\ \ldots\ r_{1m}\ r_{23}\ r_{24}\ \ldots\ r_{2m}\ r_{34}\ \ldots\ r_{(m-1)m}]$. In the process of voting, each response casts a vote for one of the two classes (e.g., background class versus non-background class). A vote is cast by comparing the response to a predetermined value, such as zero. As a non-limiting example, if the response is equal to or greater than zero, it is one class; if less than zero, the other class. The class with the most votes determines which class the input features are predicted to belong. Depending on the thresholds chosen, the outcomes may be biased towards classifying input to a certain class, such as the background class. Often, a bias may raise the true-positive rate for one class at a cost of lowering the true-positive rate for another only slightly, thereby also raising the overall average true-positive rate across classes.

In the present invention, r'=r+x, where $x=(t_{12}, t_{13}, t_{14}, \ldots, t_{1M}, \ldots)$ is the set of threshold-offsets. As shown in FIG. 1, PSO is used to tune the set of threshold-offsets x 108 to optimize an objective function of classification performance, which is described in further detail below. The set of threshold-offsets x is applied 110 to the responses r 106 to obtain r' 112. Finally, a majority vote 114 is performed based on the responses to determine which class the input features are predicted to belong. The output y 116 represents the class prediction for each input feature.

Depending on the problem, the objective function can be defined as:

$$f_1(x) = AUC_1(r'(x)) + AUC_2(r'(x)) + AUC_3(r'(x)) + \ldots \quad (1)$$

$$f_2(x) = AUC_1(r'(x)) * AUC_2(r'(x)) * AUC_3(r'(x)) * \ldots \quad (2)$$

$$f_3(x) = TP_1(r'(x)) + TP_2(r'(x)) + TP_3(r'(x)) + \ldots \quad (3)$$

$$f_4(x) = TP_1(r'(x)) * TP_2(r'(x)) * TP_3(r'(x)) * \ldots, \quad (4)$$

where AUC denotes the area under the ROC curve, and TP denotes the true-positive rate. Objectives (1) and (2) are functions of the areas under the ROC curve (i.e., true-positives vs. false-positives curve), while objectives (3) and (4) are functions of the true-positive rate for a given false-positive rate. The subscript denotes the class. The objectives using the sum over the classes (objectives (1) and (3)) result in maximizing the average performance for each class. The objectives using the products (objectives (2) and (4)) favor that all factors be equally high. The first set of objectives (objectives (1) and (2)), using the AUC, tunes the thresholds to obtain the best classifiers over all operating points. The second set of objectives (objectives (3) and (4)), using the TP, obtains the best classifiers for a given operating point.

An example of an algorithm for finding x that maximizes $f_k(x)$ is summarized below:

Require: Number of classes M
Require: Set of r=M(M−1)/2 classification responses ($r_{12}, r_{13}, r_{14}, \ldots, r_{1M}, \ldots$)
Require: c1,c2,w PSO damping factors. typ: (1,1,0.8)
Require: Number of iterations N
Require: Number of particles P
Require: Range of thresholds to search over X. typ: X=10
Require: Objective function f(x)

```
1:    dim = M(M-1)/2
2:    v = zeros(dim, 1)
3:    x = rand(dim, P) * 2-1) * X
4:    1 = x
```

```
 5:     gconf = -inf
 6:     lconf = -inf(dim, 1)
 7:     for n = 1:N
 8:         for i = 1:P
 9:             xconf(i) = f(x(:, i))
10:             if(lcongf(i) < xconf(i))
11:                 lconf(i) = xconf(i)
12:                 l(:, i) = x(:, i)
13:             end
14:         end
15:         for i = 1:P
16:             if(gconf(i) < lconf(i))
17:                 gconf(i) = max(gconf(i), lconf(i))
18:                 g(:, i) = l(:, i)
19:             end
20:         end
21:
22:         r1 = rand(0, c1)
23:         r2 = rand(0, c2)
24:         v = w * v + r1 * (1-x) + r2 * (repmat(g,[1 P])-x)
25:         x = x + v
26:     end
27:     return g
```

Figure 2:
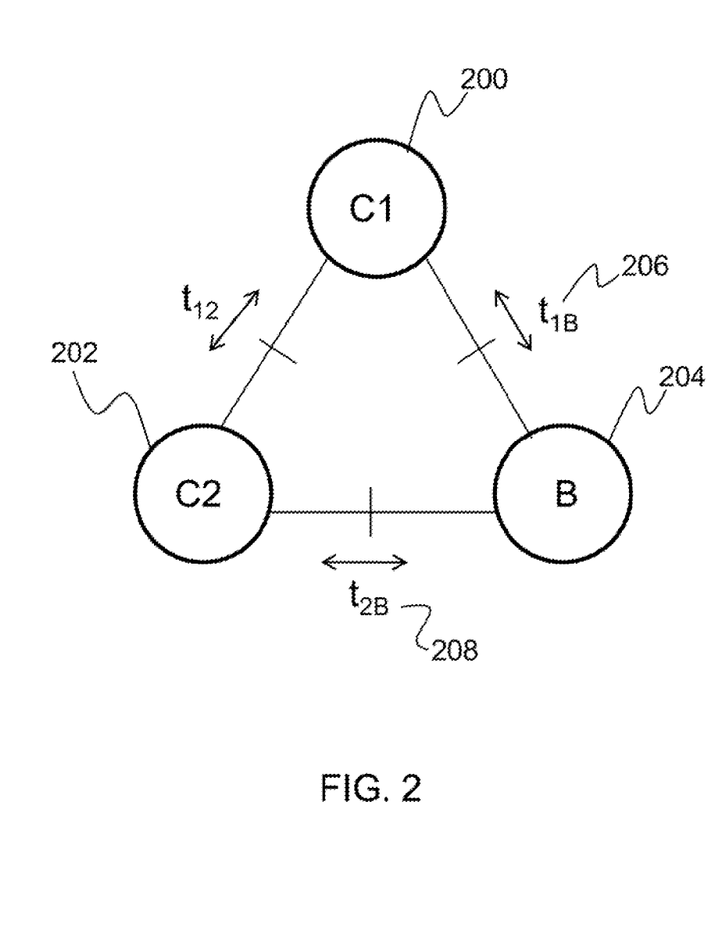
FIG. 2 is a diagram illustrating the application of a series of scalar thresholds to binary classifier responses according to the present invention.

To compute the multi-class ROC curve for a given threshold offset x, first the threshold-offset for all classifier responses is applied. Then, a series of scalar thresholds t are applied to the binary classifiers that pertain to the background class to compute a confusion matrix. A confusion matrix contains information about actual and predicted classifications done by a classification system. To generate a series of confusion matrices for the case of two positive classes, $C_1$ 200 and $C_2$ 202, and a background class B 204, a threshold t is applied on responses $t_{1B}$ 206 and $t_{2B}$ 208 as illustrated in FIG. 2.

Figure 3:
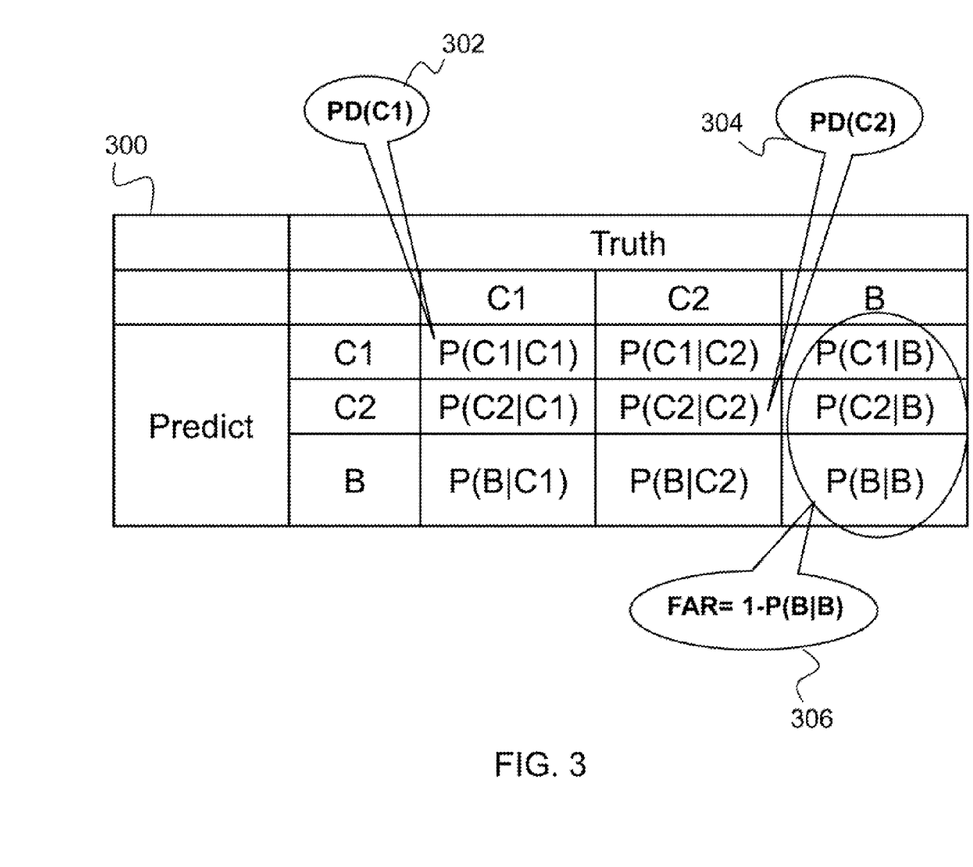
FIG. 3 is a confusion matrix calculated after applying the threshold-offset to all binary classifier responses according to the present invention.
Figure 4:
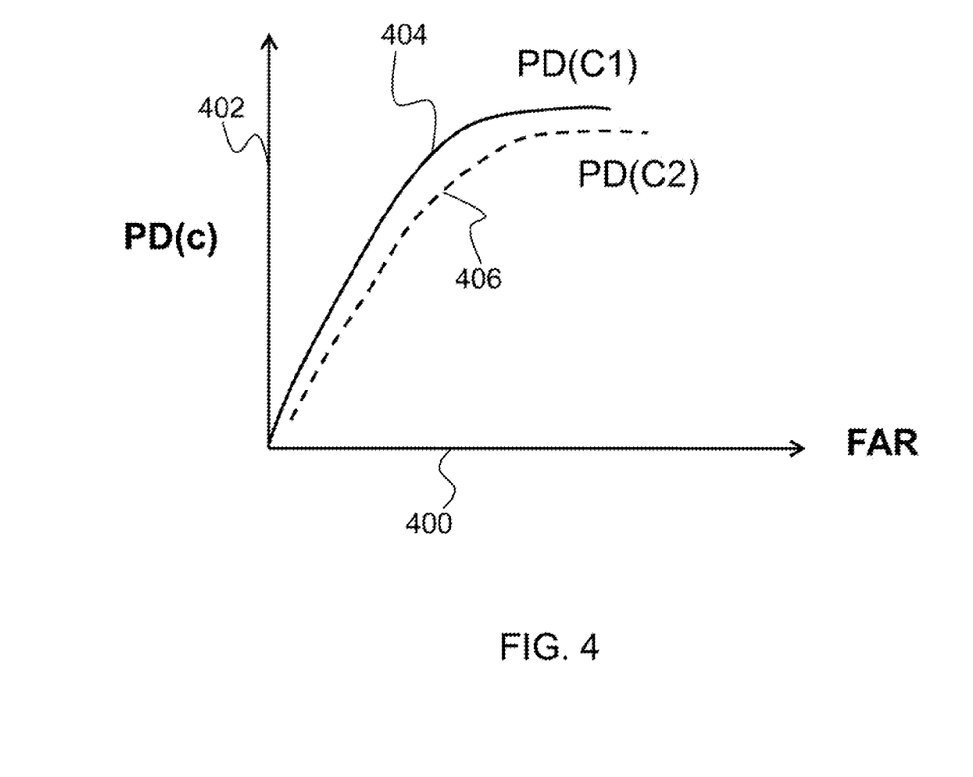
FIG. 4 is a graph depicting a multi-class receiver-operator-characteristics (ROC) curve according to the present invention.

FIG. 3 depicts a confusion matrix calculated after applying the threshold-offset to all binary classifier responses and the threshold to the component binary-classifiers involving the background class. From here, the diagonal entries for classes $c_1$ and $c_2$, $P(C_1|C_1)$ 302 and $P(c_2|c_2)$ 304, are the true-positive rates and $1-P(B|B)$ 306 is the false-positive, or false alarm rate (FAR). A series of thresholds will result in a series of true-positive rate and false-positive rate tuples (i.e., ordered list of elements) needed to plot the multi-class ROC. FIG. 4 illustrates an abstract depiction of the multi-class ROC curve, where the x-axis 400 represents the false-positive rate, or FAR, while the y-axis 402 represents the true-positive rate, or probability of detection PD(c). Each curve represents the true-positive and false-positive trade-off for a particular class. For instance, curve PD(C1) 404 represents the true-positive and false-positive trade-off for class $c_1$, while curve PD(C2) 406 represents the true-positive and false-positive trade-off for class $c_2$. Finally, the AUC, or the true-positive rate for a given false-positive rate, is extracted from the curve. The AUC is equal to the probability that a classifier will rank a randomly chosen positive instance higher than a randomly chosen negative one.

Figure 5:
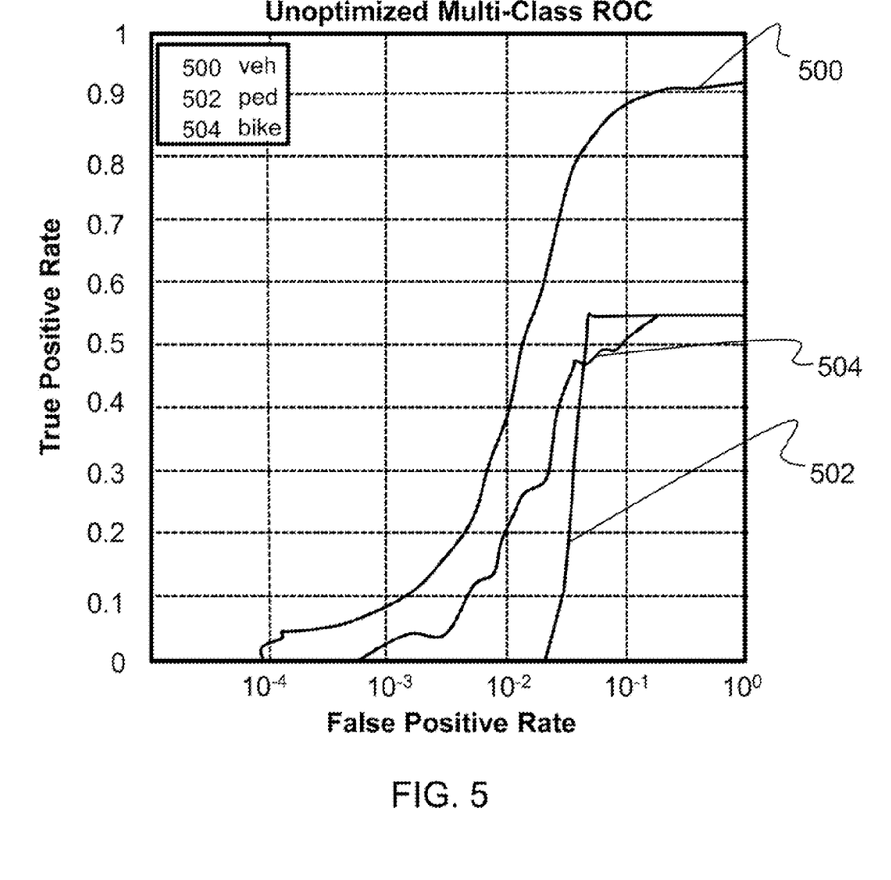
FIG. 5 is a graph depicting ROC curves for three object classes prior to PSO according to the present invention.
Figure 6:
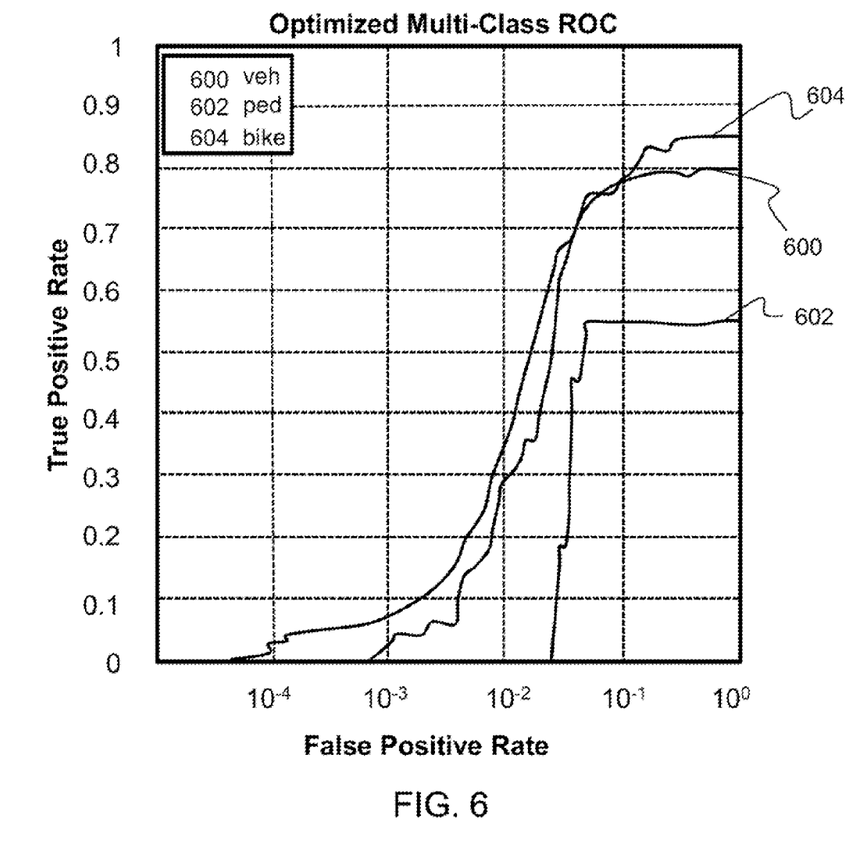
FIG. 6 is a graph depicting ROC curves for three object classes after tuning with PSO according to the present invention.
Figure 7:
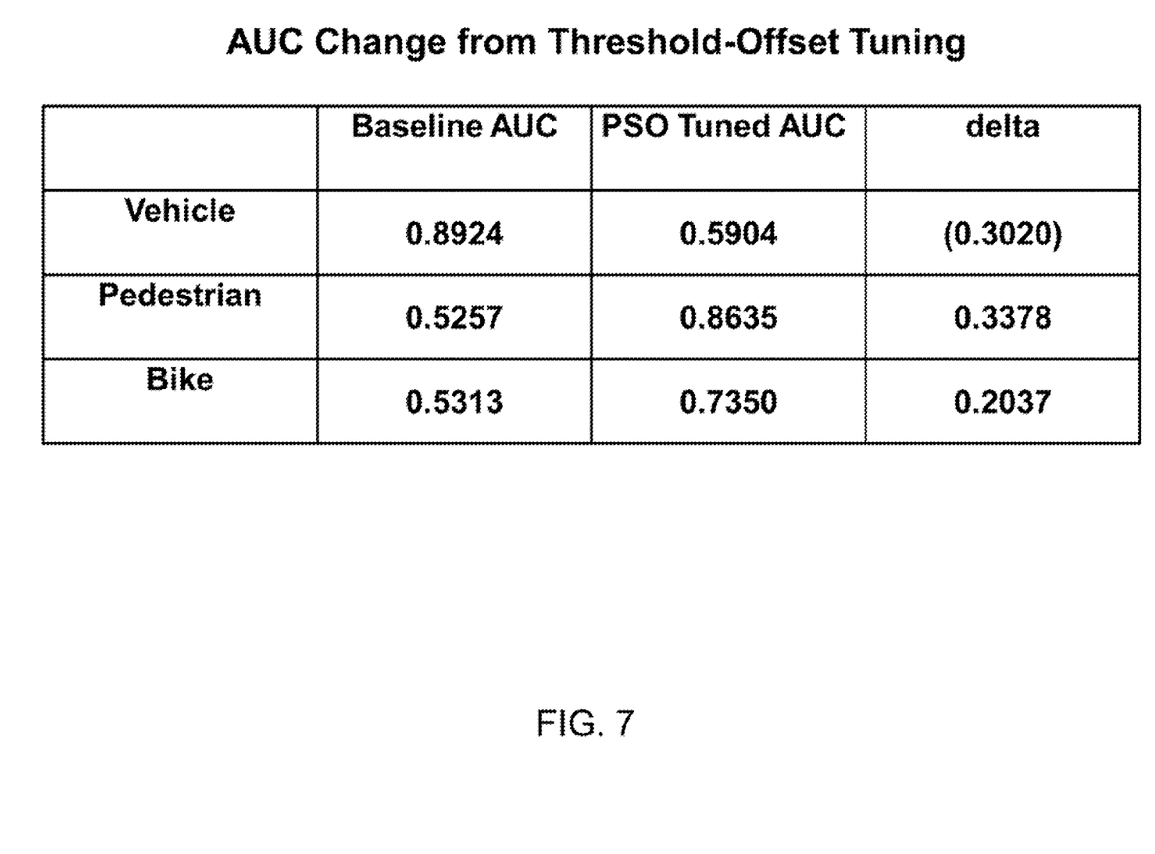
FIG. 7 is a table showing area under the curve (AUC) changes from threshold-offset tuning with PSO according to the present invention.

An example output from an unoptimized multi-class ROC for a multi-class classifier is shown in FIG. 5. Curve 500 represents objects detected as vehicle class, curve 502 represents objects detected as pedestrian class, and curve 504 represents objects detected as bike class. FIG. 6 depicts the resulting multi-class ROC after applying the PSO threshold-offset tuning routine with objective function (2). Curve 600 represents objects detected as vehicle class, curve 602 represents objects detected as pedestrian class, and curve 604 represents objects detected as bike class. The geometric mean (product) of the AUCs is used as the objective function for this instance and the tuning procedure raised the value from 0.6294 to 0.7209. As shown in the table depicted in FIG. 7, the result of tuning lowered the AUC for the vehicle class by 0.3020, but it raised the AUC for the bike class by 0.2037 and the pedestrian class by 0.3378, which combined is more than the amount lost for the vehicle class.

Figure 8:
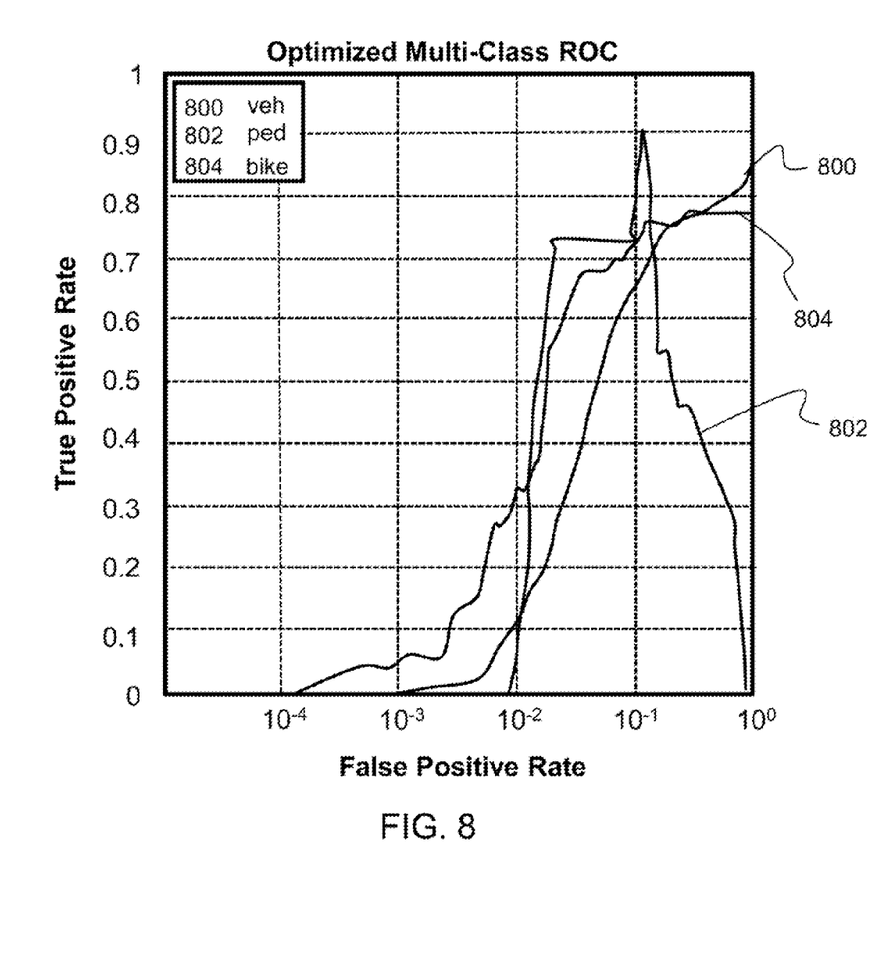
FIG. 8 is a graph depicting ROC curves for three object classes after tuning with PSO.
Figure 9:
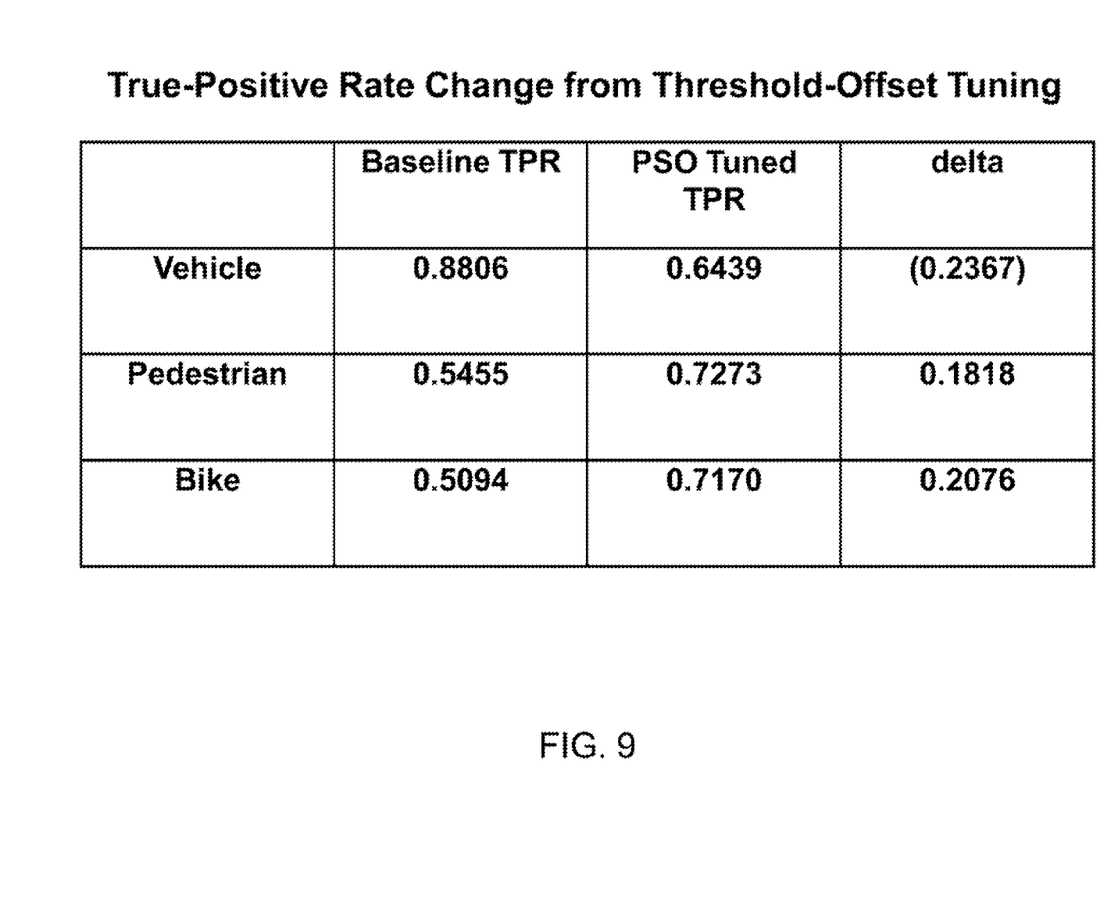
FIG. 9 is a table showing true-positive (TP) rate changes from threshold-offset tuning with PSO according to the present invention.

FIG. 8 illustrates the resulting multi-class ROC after applying the PSO threshold-offset tuning routine with objective (4). Curve 800 represents objects detected as vehicle class, curve 802 represents objects detected as pedestrian class, and curve 804 represents objects detected as bike class. The geometric mean (product) of the true-positive rates at 10% false alarm rate is used as the objective function for this instance. The tuning procedure raised the mean value from 0.1604 to 0.2420. As shown in the table depicted in FIG. 9, the cost of losing 23% true-positive rate (TPR) in the vehicle class is offset by a more than 18% increase in TPR for both pedestrian and bike classes.

Figure 10:
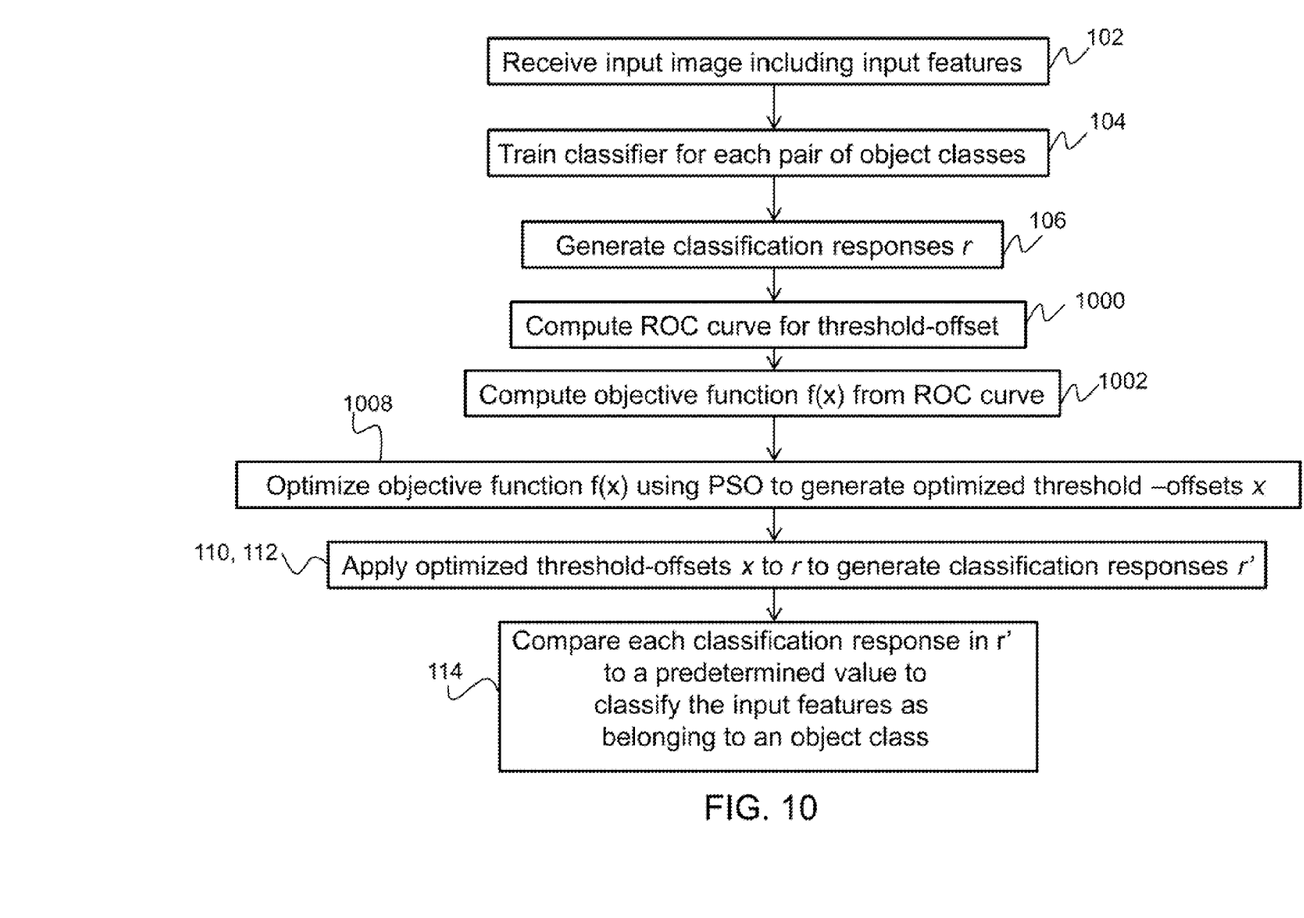
FIG. 10 is a flow diagram depicting a method of multi-class classifier threshold-offset estimation with PSO according to the present invention.

FIG. 10 is a flow diagram detailing the major steps involved in threshold-offset estimation with PSO for multi-class classification, which expands on what is depicted in FIG. 1. First, the system receives an input image consisting of input features 102. A classifier is trained for each pair of a plurality of object classes 104. Then, a set of classification responses r is generated based on the input features 106. A ROC curve is computed for a set of threshold-offsets x 1000, as described above. The system next computes an objective function f(x) from components of the ROC curve 1002. The objective function f(x) is optimized using PSO to generate a set of optimized threshold-offsets x 1008. The set of optimized threshold-offsets x is then applied to the classification responses r to generate a set of classification responses r' 110 and 112. Finally, each classification response in the set of classification responses r' is compared to a predetermined value (e.g., zero) to classify the input features as belonging to a particular object class 114, as described in detail above.

Figure 11:
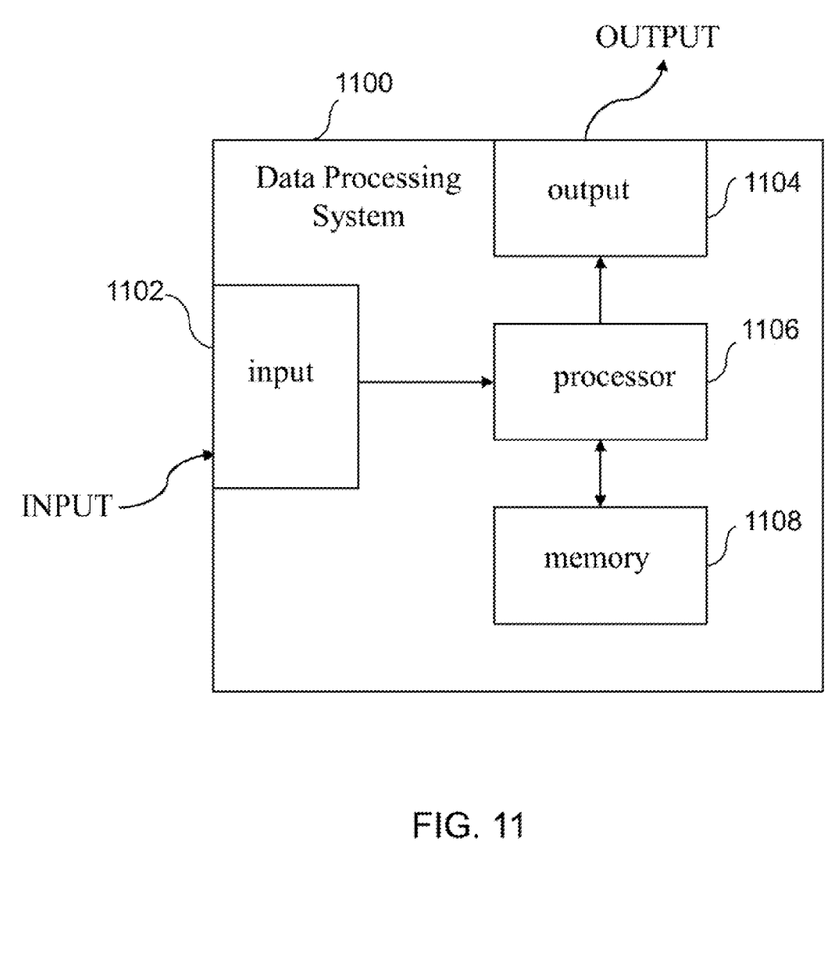
FIG. 11 is an illustration of a data processing system according to the present invention.

FIG. 11 illustrates a block diagram depicting components of a data processing system 1100 (e.g., computer) incorporating the operations of the method described above and throughout the specification. The method utilizes a data processing system 1100 for storing computer executable instructions (or instruction means) for causing a processor to carry out the operations of the above described method. The data processing system 1100 comprises an input 1102 for receiving information from a user. Information received may include input from devices such as cameras, scanners, keypads, keyboards, microphone, other peripherals such as storage devices, other programs, etc. The input 1102 may include multiple "ports." An output 1104 is connected with a processor 1106 (or processors) for providing information for transmission to other data processing systems, to storage devices, to display devices such as monitors, to generating information necessary for delivery, and to other mechanisms for presentation in user-usable forms. The input 1102 and the output 1104 are both coupled with the processor 1106, which may be a general-purpose computer processor or a specialized processor designed specifically for use with the present invention. The processor 1106 is coupled with a memory 1108 to permit storage of data and software to be manipulated by commands to the processor 1106. The memory 1108 includes instructions such that when the instructions are executed, the processor 1108 (or processors) performs operations described above and throughout the specification.

Figure 12:
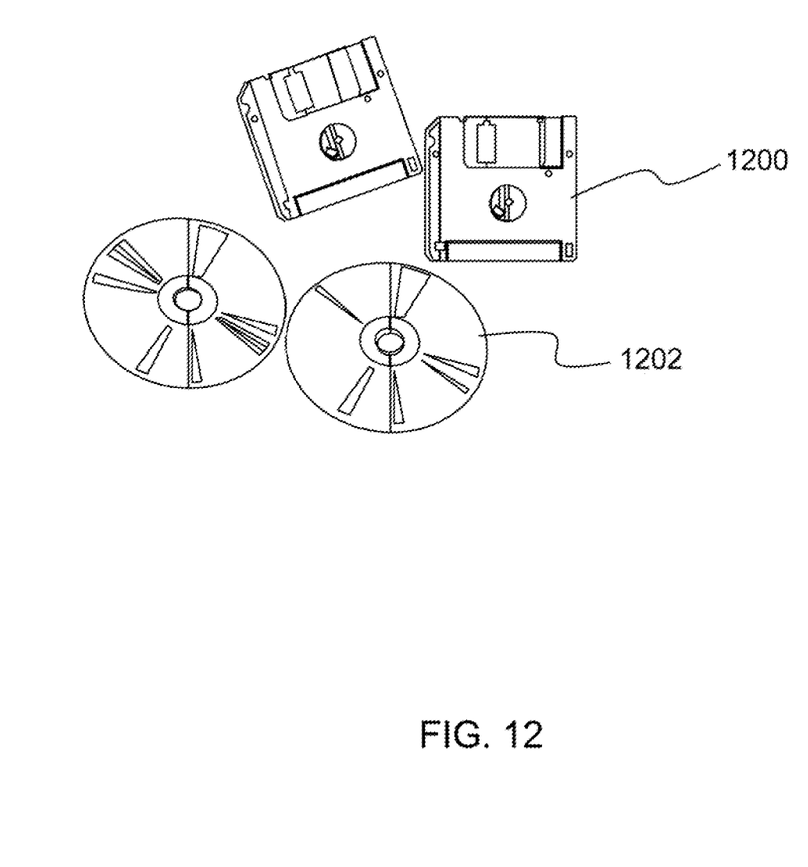
FIG. 12 is an illustration of a computer program product according to the present invention.

An illustrative diagram of a computer program product embodying the present invention is depicted in FIG. 12. As a non-limiting example, the computer program product is depicted as either a floppy disk 1200 or an optical disk 1202. However, as mentioned previously, the computer program product generally represents computer readable code (i.e., instruction means or instructions) stored on any compatible non-transitory computer readable medium.

The invention described herein is applicable to systems for visual object recognition of multiple classes. Non-limiting examples of applications include automatic target recognition and surveillance systems. However, as can be appreciated by one skilled in the art, the invention is applicable to all multi-class classification systems that utilize a pair-wise classifier approach.

What is claimed is:

1. A system for multi-class classifier threshold-offset estimation for visual object recognition, the system comprising:
   one or more processors and a memory having instructions such that when the instructions are executed, the one or more processors perform operations of:
   receiving an input image comprising a set of input features;
   training a classifier for each pair of a plurality of object classes M;
   generating a set of classification responses r based on the set of input features;
   computing a multi-class receiver-operating-characteristics (ROC) curve for a set of threshold-offsets x;
   computing an objective function of classification performance f(x) from the ROC curve;
   optimizing the objective function of classification performance f(x) through particle swarm optimization to generate a set of optimized threshold-offsets x;
   applying the set of optimized threshold-offsets x to the set of classification responses r to generate a set of classification responses r'; and
   comparing each classification response in the set of classification responses r' to a predetermined value to classify the set of input features as belonging to an object class.

2. The system for multi-class classifier threshold-offset estimation as set forth in claim 1, wherein the set of classification responses r is a set of $M(M-1)/2$ classification responses, where $r=[r_{12}\ r_{13}\ r_{14}\ \ldots\ r_{1m}\ r_{23}\ r_{24}\ \ldots\ r_{2m}\ r_{34}\ \ldots\ r_{(m-1)m}]$, and each subscript denotes an object class.

3. The system for multi-class classifier threshold-offset estimation as set forth in claim 2, wherein $r'=r+x$, where $x=(t_{12},\ t_{13},\ t_{14},\ \ldots,\ t_{1M},\ \ldots)$, and where t denotes a threshold-offset.

4. The system for multi-class classifier threshold-offset estimation as set forth in claim 3, wherein the system further performs operation of:
   generating a vote designating the set of input features as belonging to one object class of each pair of the plurality of object classes M or the other to generate a set of votes;
   collecting the set of votes to determine which object class of the plurality of object classes M received a majority of the set of votes;
   classifying the set of input features as belonging to the object class receiving the majority of the set of votes.

5. The system for multi-class classifier threshold-offset estimation as set forth in claim 4, wherein the system further performs operations of:
   extracting an area under the ROC curve (AUC) to determine a true-positive (TP) rate for a given false-positive rate; and
   defining the objective function as:

$$f_1(x)=AUC_1(r'(x))+AUC_2(r'(x))+AUC_3(r'(x))+\ldots,$$

wherein each subscript denotes an object class.

6. The system for multi-class classifier threshold-offset estimation as set forth in claim 4, wherein the system further performs operations of:
   extracting an area under the ROC curve (AUC) to determine a true-positive (TP) rate for a given false-positive rate; and
   defining the objective function as:

$$f_2(x)=AUC_1(r'(x))*AUC_2(r'(x))*AUC_3(r'(x))*\ldots,$$

wherein each subscript denotes an object class and * denotes multiplication.

7. The system for multi-class classifier threshold-offset estimation as set forth in claim 4, wherein the system further performs operations of:
   extracting an area under the ROC curve (AUC) to determine a true-positive (TP) rate for a given false-positive rate; and
   defining the objective function as:

$$f_3(x)=TP_1(r'(x))+TP_2(r'(x))+TP_3(r'(x))+\ldots,$$

wherein each subscript denotes an object class.

8. The system for multi-class classifier threshold-offset estimation as set forth in claim 4, wherein the system further performs operations of:
   extracting an area under the ROC curve (AUC) to determine a true-positive (TP) rate for a given false-positive rate; and
   defining the objective function as:

$$f_4(x)=TP_1(r'(x))*TP_2(r'(x))*TP_3(r'(x))*\ldots,$$

wherein each subscript denotes an object class and * denotes multiplication.

9. A computer-implemented method for multi-class classifier threshold-offset estimation for visual object recognition, comprising an act of:
   causing a data processor to execute instructions stored on a memory such that upon execution, the data processor performs operations of:
   receiving an input image comprising a set of input features;
   training a classifier for each pair of a plurality of object classes M;
   generating a set of classification responses r based on the set of input features;
   computing a multi-class receiver-operating-characteristics (ROC) curve for a set of threshold-offsets x;
   computing an objective function of classification performance f(x) from the ROC curve;
   optimizing the objective function of classification performance f(x) through particle swarm optimization to generate a set of optimized threshold-offsets x;
   applying the set of optimized threshold-offsets x to the set of classification responses r to generate a set of classification responses r'; and
   comparing each classification response in the set of classification responses r' to a predetermined value to classify the set of input features as belonging to an object class.

10. The method for multi-class classifier threshold-offset estimation as set forth in claim 9, wherein the set of classification responses r is a set of $M(M-1)/2$ classification responses, where $r=[r_{12}\ r_{13}\ r_{14}\ \ldots\ r_{1m}\ r_{23}\ r_{24}\ r_{2m}\ r_{34}\ \ldots\ r_{(m-1)m}]$, and each subscript denotes an object class.

11. The method for multi-class classifier threshold-offset estimation as set forth in claim 10, wherein $r'=r+x$, where $x=(t_{12},\ t_{13},\ t_{14},\ \ldots,\ t_{1M},\ \ldots)$, and where t denotes a threshold-offset.

12. The method for multi-class classifier threshold-offset estimation as set forth in claim 11, further comprising an act of:
   generating a vote designating the set of input features as belonging to one object class of each pair of the plurality of object classes M or the other to generate a set of votes;
   collecting the set of votes to determine which object class of the plurality of object classes M received a majority of the set of votes;

classifying the set of input features as belonging to the object class receiving the majority of the set of votes.

13. The method for multi-class classifier threshold-offset estimation as set forth in claim 12, further comprising acts of:
extracting an area under the ROC curve (AUC) to determine a true-positive (TP) rate for a given false-positive rate; and
defining the objective function as:

$$f_1(x)=AUC_1(r'(x))+AUC_2(r'(x))+AUC_3(r'(x))+\ldots,$$

wherein each subscript denotes an object class.

14. The method for multi-class classifier threshold-offset estimation as set forth in claim 12, further comprising acts of:
extracting an area under the ROC curve (AUC) to determine a true-positive (TP) rate for a given false-positive rate; and
defining the objective function as:

$$f_2(x)=AUC_1(r'(x))*AUC_2(r'(x))*AUC_3(r'(x))*\ldots,$$

wherein each subscript denotes an object class and * denotes multiplication.

15. The method for multi-class classifier threshold-offset estimation as set forth in claim 12, further comprising acts of:
extracting an area under the ROC curve (AUC) to determine a true-positive (TP) rate for a given false-positive rate; and
defining the objective function as:

$$f_3(x)=TP_1(r'(x))+TP_2(r'(x))+TP_3(r'(x))+\ldots,$$

wherein each subscript denotes an object class.

16. The method for multi-class classifier threshold-offset estimation as set forth in claim 12, further comprising acts of:
extracting an area under the ROC curve (AUC) to determine a true-positive (TP) rate for a given false-positive rate; and
defining the objective function as:

$$f_4(x)=TP_1(r'(x))*TP_2(r'(x))*TP_3(r'(x))*\ldots,$$

wherein each subscript denotes an object class and * denotes multiplication.

17. A computer program product for multi-class classifier threshold-offset estimation for visual object recognition, the computer program product comprising: computer-readable instruction means stored on a non-transitory computer-readable medium that are executable by a computer having a processor for causing the processor to perform operations of:
receiving an input image comprising a set of input features;
training a classifier for each pair of a plurality of object classes M;
generating a set of classification responses r based on the set of input features;
computing a multi-class receiver-operating-characteristics (ROC) curve for a set of threshold-offsets x;
computing an objective function of classification performance f(x) from the ROC curve;
optimizing the objective function of classification performance f(x) through particle swarm optimization to generate a set of optimized threshold-offsets x;
applying the set of optimized threshold-offsets x to the set of classification responses r to generate a set of classification responses r'; and
comparing each classification response in the set of classification responses r' to a predetermined value to classify the set of input features as belonging to an object class.

18. The computer program product for multi-class classifier threshold-offset estimation as set forth in claim 17, wherein the set of classification responses r is a set of M(M−1)/2 classification responses, where $r=[r_{12}\ r_{13}\ r_{14}\ \ldots\ r_{1m}\ r_{23}\ r_{24}\ \ldots\ r_{2m}\ r_{34}\ \ldots\ r_{(m-1)m}]$, and each subscript denotes an object class.

19. The computer program product for multi-class classifier threshold-offset estimation as set forth in claim 18, wherein $r'=r+x$, where $x=(t_{12}, r_{13}, t_{14}, \ldots t_{1M}, \ldots)$, and where t denotes a threshold-offset.

20. The computer program product for multi-class classifier threshold-offset estimation as set forth in claim 19, further comprising instruction means for causing the processor to perform an operation of:
generating a vote designating the set of input features as belonging to one object class of each pair of the plurality of object classes M or the other to generate a set of votes;
collecting the set of votes to determine which object class of the plurality of object classes M received a majority of the set of votes;
classifying the set of input features as belonging to the object class receiving the majority of the set of votes.

21. The computer program product for multi-class classifier threshold-offset estimation as set forth in claim 20, further comprising instruction means for causing the processor to perform operations of:
extracting an area under the ROC curve (AUC) to determine a true-positive (TP) rate for a given false-positive rate; and
defining the objective function as:

$$f_1(x)=AUC_1(r'(x))+AUC_2(r'(x))+AUC_3(r'(x))+\ldots,$$

wherein each subscript denotes an object class.

22. The computer program product for multi-class classifier threshold-offset estimation as set forth in claim 20, further comprising instruction means for causing the processor to perform operations of:
extracting an area under the ROC curve (AUC) to determine a true-positive (TP) rate for a given false-positive rate; and
defining the objective function as:

$$f_2(x)=AUC_1(r'(x))*AUC_2(r'(x))*AUC_3(r'(x))*\ldots,$$

wherein each subscript denotes an object class and * denotes multiplication.

23. The computer program product for multi-class classifier threshold-offset estimation as set forth in claim 20, further comprising instruction means for causing the processor to perform operations of:
extracting an area under the ROC curve (AUC) to determine a true-positive (TP) rate for a given false-positive rate; and
defining the objective function as:

$$f_3(x)=TP_1(r'(x))+TP_2(r'(x))+TP_3(r'(x))+\ldots,$$

wherein each subscript denotes an object class.

24. The computer program product for multi-class classifier threshold-offset estimation as set forth in claim 20, further comprising instruction means for causing the processor to perform operations of:
extracting an area under the ROC curve (AUC) to determine a true-positive (TP) rate for a given false-positive rate; and
defining the objective function as:

$$f_4(x)=TP_1(r'(x))*TP_2(r'(x))*TP_3(r'(x))*\ldots,$$

wherein each subscript denotes an object class and * denotes multiplication.

* * * * *